United States Patent [19]

Szoke et al.

[11] Patent Number: 4,500,843
[45] Date of Patent: Feb. 19, 1985

[54] MULTIFREQUENCY, SINGLE PASS FREE ELECTRON LASER

[75] Inventors: Abraham Szoke, Fremont; Donald Prosnitz, Walnut Creek, both of Calif.

[73] Assignee: The United States of America as represented by the United States Department of Energy, Washington, D.C.

[21] Appl. No.: 342,680

[22] Filed: Jan. 26, 1982

[51] Int. Cl.³ .............................................. H01S 3/14
[52] U.S. Cl. ........................................ 330/4.3; 372/2; 372/69
[58] Field of Search .................. 330/4.3; 372/2, 69, 372/92; 315/3.5

[56] References Cited

U.S. PATENT DOCUMENTS

| | | | |
|---|---|---|---|
| 3,789,257 | 1/1974 | Friedman et al. | 372/2 |
| 4,162,432 | 7/1979 | Schlitt | 372/74 |
| 4,283,687 | 8/1981 | Madey et al. | 372/7 |
| 4,287,488 | 9/1981 | Brau et al. | 372/2 |
| 4,323,857 | 4/1982 | Brau et al. | 372/69 |
| 4,331,936 | 5/1982 | Schliesinger et al. | 372/2 |
| 4,337,413 | 6/1982 | Pantvianne | 315/3.5 |
| 4,345,329 | 8/1982 | Doucet et al. | 372/2 |
| 4,395,655 | 7/1983 | Wurthman | 315/5 |
| 4,425,649 | 1/1984 | Elias et al. | 372/2 |

OTHER PUBLICATIONS

Kroll et al., "Free Electron Laser with . . . Wigglers", 2/80, pp. 1-164, Report No. JSR-79-01 for SRI Inter.
Prosnitz et al., "Preliminary . . . Linear Free Electron Laser", pp. 1-24, 2/5/79, NTIS De 820/2042, Abst. & Catalog.

Primary Examiner—Nelson Moskowitz
Attorney, Agent, or Firm—John S. Schipper; Patrick T. King; Michael F. Esposito

[57] ABSTRACT

A method for simultaneous amplification of laser beams with a sequence of frequencies in a single pass, using a relativistic beam of electrons grouped in a sequence of energies corresponding to the sequence of laser beam frequencies. The method allows electrons to pass from one potential well or "bucket" to another adjacent bucket, thus increasing efficiency of trapping and energy conversion.

2 Claims, 20 Drawing Figures

MULTIFREQUENCY, SINGLE PASS FREE ELECTRON LASER

The United States Government has rights in this invention, pursuant to Contract W-7405-ENG-48 between the U.S. Department of Energy and the University of California Lawrence Livermore National Laboratory.

FIELD OF THE INVENTION

The invention relates to coherent amplification of electromagnetic radiation interaction of a relativistic free electron beam and a parallel beam of light.

BACKGROUND OF THE INVENTION

The possibility of partially coherent reradiation of electromagnetic radiation, by collinear passage of the radiation and of a relativistic electron beam through a sequence of electric or magnetic fields of alternating polarity, has been recognized since the first publication by H. Motz, Journal of Applied Physics 22 527 (1950) on the subject. Motz considered a sequence of alternating direction magnetic fields, regularly spaced and transversely oriented relative to the common direction of travel of light beam and electron beam. Let $L_o$ be the fundamental period of variation of direction of the sequence of transverse magnetic fields and let the beam electrons move with velocity $v \simeq c$. The light beam photons will be absorbed and re-emitted by the electrons, and the frequency $\nu$ of emitted radiation will depend upon angle of observation $\theta$ relative to the common beam direction according to $\nu=(V/L_o)(1-\cos\theta)$. For a highly relativistic electron beam and modest transverse magnetic field strengths, most of the radiation appears in the forward direction, in a narrow cone of half angle of the order of $\Delta\theta = m_e c^2/E_b$ where $E_b = m_e c^2/\sqrt{1-(v/c)^2}$ is the electron total energy. This approach requires a bunched electron beam with sinusoidally varying orbit, and the Motz analysis is essentially classical and relativistic.

Motz, Thon and Whitehurst, in Jour. of Appl. Phys. 24 826 (1953), further considered the co-propagating light beam and electron beam in a waveguide, obtained some interesting general classical relativistic relationships for electron orbits in a spatially varying B-field, and reported the experimental observation of visible and millimeter wavelength (re)radiation for field strengths $B \approx 3,900$ and 5,600 Gauss.

In Proceedings of the Symposium on Millimeter Waves (Polytechnic Press, Brooklyn 1960) p. 155, Motz and Nakamura analyzed the amplification of a millimeter wavelength em. wave interacting with a relativistic electron beam in the presence of a rectangular waveguide and a spatially oscillatory electric field, using a model of J. R. Pierce. The analysis was purely classical, and the gain was rather modest.

Pantell, Soncini and Puthoff discuss some initial considerations on stimulated photon-electron scattering in I.E.E.E. Journal of Quantum Electronics QE-4 905 (1968). Collinear scattering, with the incident photo energy $h\nu$ being $<<$ incident electron energy $E_{el}$ and periodic deflection of the electron beam by a microwave radiation field, is analyzed briefly; and a Compton scattering laser is proposed, using the input/output wavelength relation $\nu_{out}=4(E_{el}/m_e c^2)^2 \nu_{in}$. Useful gain from the device appears to be limited to the middle-high infrared range $\lambda \geq 20 \mu m$.

Mourier, in U.S. Pat. No. 3,879,679, discloses a Compton effect laser that proceeds from the same principles as Pantell et al, supra. This invention, like that of Pantell et al, appears to require provision of an electron storage ring or the like for rapidly moving electrons and an optical cavity that is a part of the ring, for causing electron-photon scattering.

R. M. Phillips, in I.R.E. Transactions on Electron Devices, 231 (October 1960), used a periodic magnetic field, whose period may vary, to focus and axially bunch an electron beam traveling in an unloaded waveguide, together with a monochromatic light beam, to increase electron beam kinetic energy at the expense of light beam energy. The electron beam velocity was adjusted so that a beam electron travels one period L along its trajectory in the time required for the light beam (of wavelength $\lambda$) to travel a distance $L + \lambda$. The electron then senses only the retarding portion or only the accelerating portion of the electromagnetic wave. This approach converts transverse momentum, arising from the presence of the electromagnetic wave, into changes in axial momentum of the electron beam so that beam bunching occurs.

J. M. J. Madey, in Journal of Applied Physics 42 1906 (1971), discusses stimulated emission of bremsstrahlung by a relativistic electron into a single electromagnetic mode of a parallel light beam, where both electron and light beam move through a periodic, transverse d.c. magnetic field. Quantum mechanical and semi-classical calculations of transition rates and gain indicate that finite, practical gain is available in the infrared and visible portions of the optical spectrum. These considerations are incorporated in U.S. Pat. No. 3,822,410, issued to Madey for tunable apparatus for generation/amplification of coherent radiation in a single or a few closely spaced electromagnetic modes.

Hirshfield, in U.S. Pat. No. 3,398,376 for a relativistic electron cyclotron maser, discloses and claims use of an axial, monoenergetic relativistic electron beam ($E_{kinetic} \sim 5$ keV) a spatially-varying longitudinal magnetic field coaxial with the beam, a weaker, transverse periodic electric or magnetic with a resulting helical pitch matching that of the electron motion at the predetermined beam velocity and a cavity resonator with a mode frequency matching that of the cyclotron frequency of the resulting spiraling electrons. The apparatus relies upon electron cyclotron radiation and ignores any synchronization of the electron beam and the electromagnetic beam to be amplified.

A combination free electron laser/gas laser with high pulse repetition rates is taught by U.S. Pat. No. 4,187,686, issued to Brau, Rockwood and Stern. In the embodiment disclosed, the free electron laser operates at infrared wavelengths and the gas laser operates at ultraviolet wavelengths. The monoenergetic electron beam is initially bunched and accelerated to $\sim 10$ MeV kinetic energy and directed into and out of multiplicity of serially arranged free electron lasers by turning magnets positioned at the ends of these lasers; finally, the electron beam is directed axially through a gas laser to utilize and convert additional electron beam energy to electromagnetic energy. The free electron laser appears to be of conventional form, utilizing fixed period magnetic fields to produce electron bremsstrahlung radiation and an optical resonator for light beam amplification.

SUMMARY OF THE INVENTION

An object of this invention is to provide tunable apparatus of increased efficiency for production and/or amplification of electromagnetic radiation, simultaneously in multiple frequency regions.

Another object is to provide method and apparatus for a free electron laser.

Additional objects, novel features and advantages thereof are set forth in the detailed description, with reference to the accompanying drawings, and may be realized by means of the instrumentalities and combinations pointed out in the appended claims.

The subject invention is a method for laser beam amplification by means of a free electron laser. To achieve the foregoing objects in accordance with the subject invention, as broadly described herein, the method may include the steps of providing a relativistic beam of electrons with associated electron energies arranged in groups around certain values $E_i = m_e c^2 \gamma_r^{(i)}$ (i=1,...,n); providing a transversely oriented spatially periodic magnetic field through which the electron beam passes; providing a sequence of substantially monochromatic light beams, having photon energies $H_i$ (i=1,...,n) corresponding to the representative energies $E_i$ of the beam electrons; allowing the light beams to co-propagate with the electron beam in the transverse, periodic magnetic field; and allowing the beam electrons to be decelerated so as to partially convert electron energy to light beam energy by means of the transverse, periodic magnetic field.

DETAILED DESCRIPTION

The free electron laser (FEL) has been the subject, directly or indirectly, of several papers and U.S. patents, all of which are discussed in the background discussion herein, as a possible coherent light amplifier. The FEL is an ideal laser as it can be designed to operate at any frequency and is capable of high average power at high efficiency. John Madey demonstrated a relativistic free electron laser in 1976 [Phys. Rev. Letters, 36 717-20 (1976) and Phys. Rev. Letters, 38 892-94 (1977)]; but Madey's relativistic FEL configuration utilizes only a small portion of the total electron beam energy because it works with a single "bucket" for conversion of electron kinetic energy to energy for amplification of a co-propagating electromagnetic wave. The subject invention offers a many-fold increase in efficiency of the FEL by working with several energy "buckets" simultaneously.

The FEL uses a highly relativistic electron beam, a co-propagating light beam (to be amplified) and a traversely directed, periodic magnetic field ("wiggler" field) to convert electron longitudinal kinetic energy to electromagnetic energy at or around the frequency of the light beam by the interaction of the beam electrons with the electromagnetic field set up by the light beam e-field (of magnitude $E_s$) and the transversely directed wiggler magnetic field (of magnitude $B_w$). A large fraction of the relativistic electrons within a narrow energy range $\gamma_r \pm \Delta \gamma$ ($\gamma mc^2$ =total electron energy) are trapped in local moving potential wells called "buckets" and are decelerated, with the emitted electron radiation being taken up by the light beam passing through the region simultaneously with the electron beam. By judiciously varying the parameters of the FEL the electrons can be forced to lose energy continuously, thereby permitting extraction of a sizable fraction of the electron beam's kinetic energy.

Philip Morton, in an unpublished Stanford Linear Accelerator Center memo, circa 1978, incorporated in Kroll, Morton and Rosenbluth, Jour. of Quant. Electr. QE-17 1436-68 (1981), pointed out that a linear free electron laser is closely analogous to a traveling wave RF linear accelerator, operated in reverse. As in a Linac, electrons are held in a potential well; but in contrast to the usual Linac operation, the stable phase angle is chosen to decelerate the electrons and amplify the traveling wave in the FEL. Further, in contrast to the longitudinal accelerating field used in a Linac microwave cavity, the linear free electron laser decelerating field is formed from a transverse, static magnetic field and the amplified electromagnetic signal field.

Figure 1:
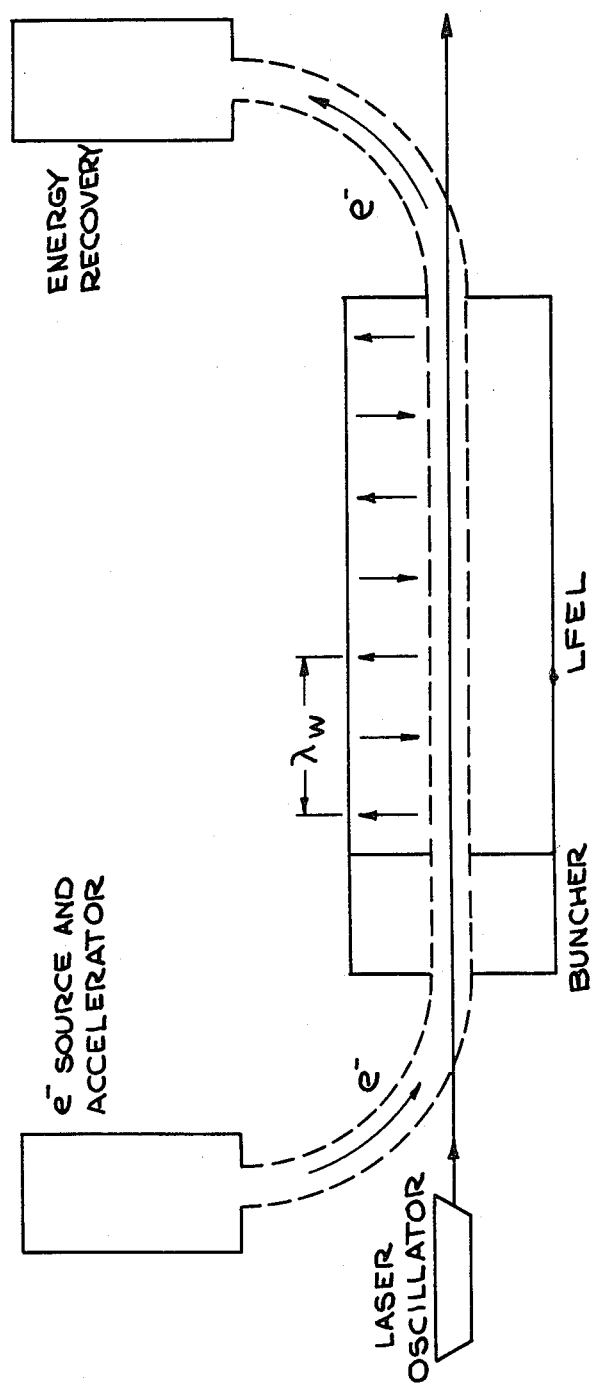
FIG. 1 is a schematic view of a linear free electron laser (FEL).

A linear free electron laser is schematically shown in FIG. 1. The first section of the LFEL is a buncher, wherein potential wells or buckets are formed. The electrons are trapped in these wells and bunched about the potential minimum at a phase angle $\psi = \psi_r$. The electron beam then passes through the power amplifier section where the parameters of the static magnetic field and the electromagnetic field are varied to form the accelerating buckets that decelerate the electrons and, concomitantly, amplify the laser field.

The wiggler field and light beam electromagnetic fields considered here are defined by $$B = \hat{j} B_w(z) \sin[\int k_w(z)dz],$$

$$E = \hat{i}\{E_s^{(1)}(z) \sin[k_s^{(1)}z - \omega_1 t + \phi_1] + E_s^{(2)}(z) \sin[k_s^{(2)}z - \omega_2 t + \phi_2]\},$$

$$\lambda_w(z) = 2\pi/k_w(z),$$

$$\lambda_s^{(1,2)} = 2\pi/k_s^{(1,2)} = 2\pi C/\omega_{1,2},$$

where it is assumed that the fractional changes in these vector fields satisfy $$\left|\frac{d}{dz}(B_w\lambda_w)\right| << B_w,$$

$$\left|\frac{dE_s^{(1,2)}}{dz}\right| << k_s^{(1,2)}E_s^{(1,2)}.$$

The two traverse electric fields $E_s^{(1)}$ and $E_s^{(2)}$ have different associated frequencies ($\omega_1 \neq \omega_2$) and hence will correspond to different electron beam resonant energies.

With the transformation to normalized variables $$e_s^{(1,2)} = \frac{eE_s^{(1,2)}}{\sqrt{2}\, mc^2} \text{ (cm}^{-1}), \tag{1}$$

$$b_w = \frac{eB_w}{\sqrt{2}\, mc} \text{ (cm}^{-1}),$$

$$\psi^{(1,2)} = \int(k_s^{(1,2)} + k_w(z))dz - \omega_{1,2}t + \phi_{1,2},$$

$$\gamma = [1 - (v/c)^2]^{\frac{1}{2}},$$

v = electron velocity,
and the restriction to initially small radiation fields $$|E_s^{(1,2)}\lambda_s/mc^2|, << 1$$

the defining equations become $$\frac{d\gamma}{dz} \doteq \frac{1}{c}\frac{d\gamma}{dt} = \frac{eE \cdot v}{mc^2} = -\frac{e_s^{(1)}b_w}{2\gamma k_w}\sin\psi^{(1)} - \frac{e_s^{(2)}b_w}{2\gamma k_w}\sin\psi^{(2)}, \tag{2}$$

$$\frac{d}{dz}(e_s^2) = -\eta \frac{JZ_o}{mc^2}\frac{d\gamma}{dz}, \tag{3}$$

$$\frac{d\psi^{(1,2)}}{dz} = k_w - \frac{k_s^{(1,2)}}{2\gamma^2}\left[1 + \frac{b_w^2}{2k_w^2} + \frac{e_s^{(1,2)}b_w}{2\gamma^2 k_w}\cos\psi^{(1,2)}\right] + \frac{d\phi_{1,2}}{dz}, \tag{4}$$

J = bunched electron current,
$Z_o$ = free space impedance = 377 ohms, $\eta$ = fractional coupling of electron energy loss to optical radiation field.

In Equation (2), a term representing the effect of the longitudinal electric self-field on the acceptable energy spread, as derived by V. K. Neil in Lawrence Livermore National Laboratory Report UCID-17985 (Nov. 28, 1978), is small and is therefore neglected here.

One useful method of analysis here focuses attention on a fictitious resonant or synchronous electron that is trapped at and moves precisely with the position of the potential minimum at the phase angle $\psi = \psi_r$. The resonance phase angles are defined by:

$$\frac{d\psi_r^{(1,2)}}{dz} = 0. \tag{5}$$

One now defines the resonance "energies"

$$\gamma_r^{(1,2)} = \left[\frac{k_s^{(1,2)}}{2k_w}\left(1 + \frac{b_w^2}{2k_w^2}\right)\right]^{\frac{1}{2}} \tag{6}$$

and focuses one's attention on beam electrons with energy $\gamma \doteq \gamma_r^{(1)}$. From Equations (4) and (6) one infers $$\frac{d\psi^{(1)}}{dz} = -\frac{k_s^{(1)}}{2}\left(1 + \frac{b_w^2}{2k_w^2}\right)\left(\frac{1}{\gamma^2} - \frac{1}{\gamma_r^{(1)2}}\right) \doteq \tag{7}$$

$$\doteq \frac{k_w}{\gamma_r^{(1)}} P$$

$$P = \gamma - \gamma_r^{(1)}, \tag{8}$$

where the last two terms in Equation (4) have been dropped as small.
This yields $$\frac{d^2\psi}{dz} = \frac{2k_w}{\gamma_r^{(1)}}\frac{dP}{dz} = -\frac{e_s^{(1)}b_w}{(\gamma_r^{(1)})^2}(\sin\psi - \sin\psi_r^{(1)}) + g(z) \tag{9}$$

$$g(z) \doteq -\frac{e_s^{(1)}b_w}{(\gamma_r^{(1)})^2}\sin[\psi - (\psi_r^{(1)} - \psi_r^{(2)})] \doteq \tag{10}$$

$$-\frac{e_s^{(1)}b_w}{(\gamma_r^{(1)})^2}\sin[\psi + \Omega_{12}z],$$

$$\Omega_{12} = \frac{k_s^{(2)} - k_s^{(1)}}{2(\gamma_r^{(1)})^2}\left(1 + \frac{b_w^2}{2k_w^2}\right).$$

Using the quantity $\epsilon = e_s^{(1)}b_w/(\gamma_r^{(1)})^2$ as a perturbation parameter, one may assume a solution $$\psi = \sum_{n=0}^{\infty} \epsilon^n \psi_n(z)$$

for Equation (1) and obtain the relations $$\frac{d^2\psi_0}{dz^2} = -\epsilon(\sin\psi_0 - \sin\psi_r^{(1)})$$

-continued $$\frac{d^2\psi_1}{dz^2} = -(\epsilon\cos\psi_0)\psi_1 - \sin(\psi_0(z) + \Omega_{12}z)$$

$$\psi_1(z) = \frac{\epsilon}{\Omega_{12}^2 - \cos\psi_0} \sin(\psi_0(z) + \Omega_{12}z) \quad (5)$$

Further analysis indicates that, if $$\frac{\epsilon}{\Omega_{12}^2} << \div 1, \quad (11)$$

the $\psi_0$ orbit for $k_s = k_s^{(1)}$ is not changed by the presence of the second electromagnetic wave ($k_s = k_s^{(2)}$), to second order in $\epsilon$, and the buckets associated with each resonance energy $\gamma = \gamma_r^{(1)}$ and $\gamma = \gamma_r^{(2)}$ develop independently of one another. Thus, the single bucket approach, applied separately to each resonant energy group, is a good approximation, if the relation (11) is valid.

One now ignores the presence of other electromagnetic fields $k_s^{(n)}$ ($n \neq 1$), again focuses attention on electron energies $\gamma = \gamma_r^{(1)}$, and rewrites Equations (7) and (9) as $$\frac{d\psi}{dz} = A(z)P, \quad (12)$$

$$\frac{dP}{dz} = -C(z)(\sin\psi - \sin\psi_r), \quad (13)$$

$$A(z) = \frac{2k_w}{\gamma_r} = \frac{k_s}{\gamma_r^3}\left(1 + \frac{b_w^2}{2k_w^2}\right),$$

$$C(z) = \frac{b_w e_s}{2k_w \gamma_r},$$

where the term g(z) in Equation (9) has been dropped and it is assumed that $d\psi_r/dz = 0$. The coupled equations of motion (12) and (13) are derivable from a Hamiltonian $$H = \tfrac{1}{2}A(z)P^2 + F(\psi), \quad (14)$$

$$F(\psi) = -C(z)(\cos\psi + \psi \sin\psi_r). \quad (15)$$

Figure 2:
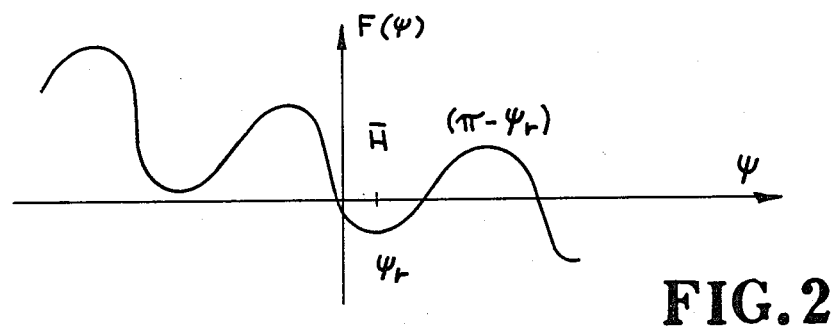
FIG. 2 is a graphic view of the variation of the phase function $F(\psi)$ with phase stability angle $\psi$.

FIG. 2 graphically displays the potential $F(\psi)$. If one now assumes, as done here, that the variations of A(z) and C(z) with z are sufficiently slow that the motion is adiabatic, the electrons with "energies" $\gamma = \gamma_r$ will trace out trajectories in the phase plane $(P, \psi)$ given by $$P(H_0, \psi) = \sqrt{\frac{2}{A}(H_0 - F(\psi))}, \quad (16)$$

where $H_0$ is the initial value of the Hamiltonian.

Figure 3:
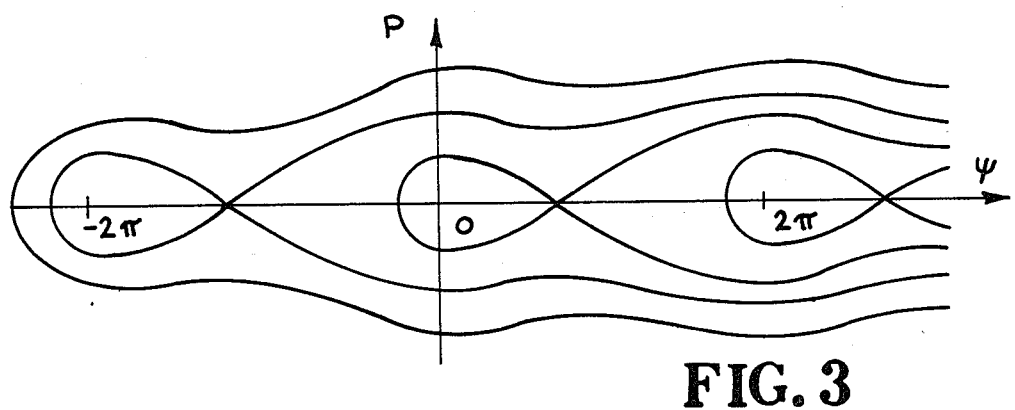
FIG. 3 is a graphic view of representative stable electron trajectories in phase space $(P, \psi)$.

FIG. 3 exhibits a sequence of adiabatic trajectories for a common choice of $C > 0$, corresponding to a sequence of Hamiltonian values $\{H_n = H_0 + 2n\pi\}^\infty_{n=-\infty}$. Note that each trajectory defines a closed region or "bucket" and all buckets in the sequence are congruent for the sequence of Hamiltonians $\{H_n\}$. Concentrating on the phase space bucket in the region $-\pi < \psi < \pi$ (FIG. 4), one verifies that $$F(\psi_r) < F(\psi) < F(\pi - \psi_r),$$

and the maximum stable phase curve corresponds to the choice $$H_0 = H_{max} = C[\cos\psi_r - (\pi - \psi_r)\sin\psi_r], \quad (17)$$

$$P_{max} = \pm\left[\frac{4C}{A}\left(\cos\psi_r - \left(\frac{\pi}{2} - \psi_r\right)\sin\psi_r\right)\right]^{\tfrac{1}{2}},$$

$\psi_L < \psi < \pi - \psi_r$ with

The buckets shown in FIG. 3 are decelerating for $C < 0$ since $d\gamma/dz = -C\sin\psi_r < 0$ from Equation 2.

Figure 4:
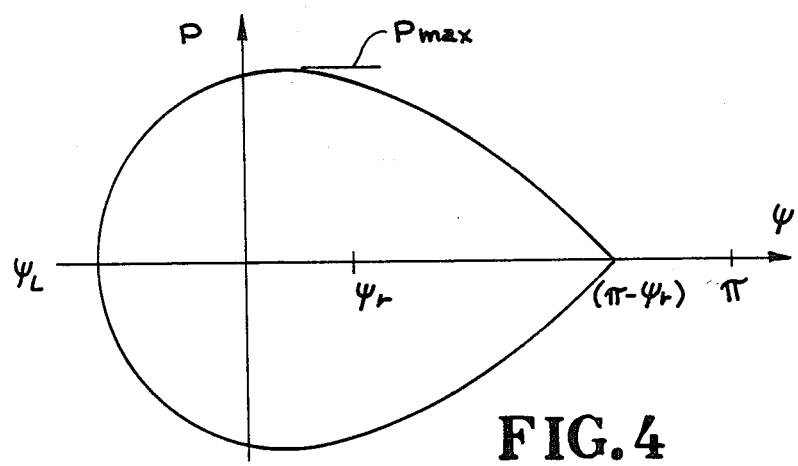
FIG. 4 is a graphic representation of a phase space "bucket" or maximum region of electron stability.
Figure 5:
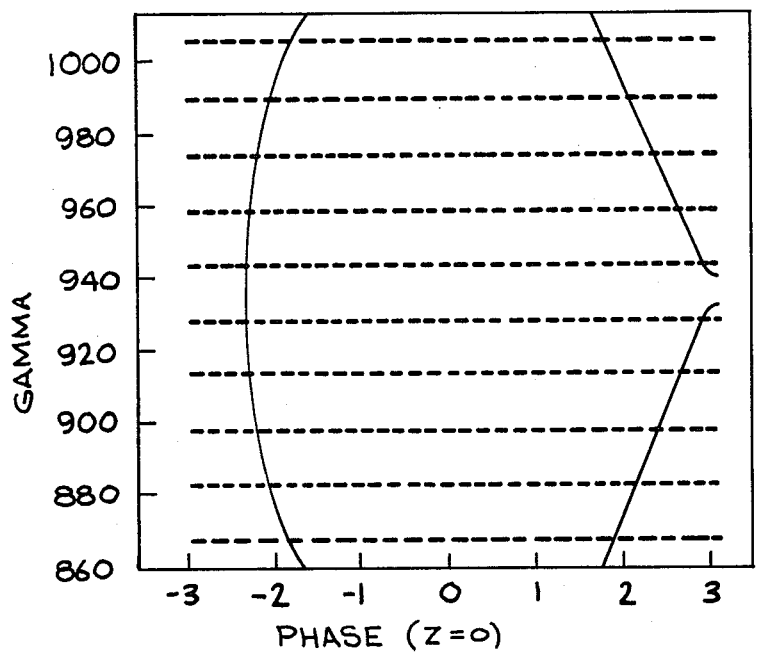
FIG. 5 is a schematic representation of initial (Z=0) electron distribution in a phase space "bucket".
Figure 6:
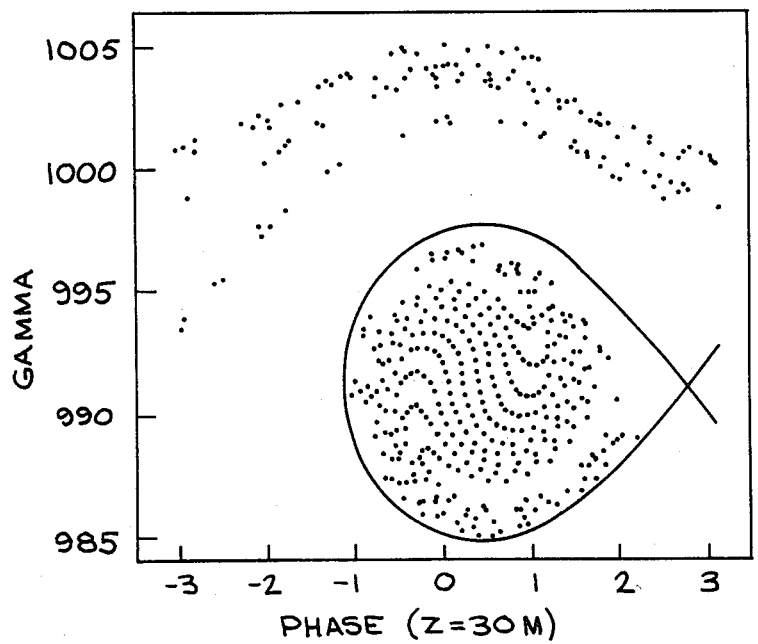
FIG. 6 is a schematic representation of distribution of the remaining electrons in a "bucket" after the bucket has traveled Z=30 m.
Figure 7:
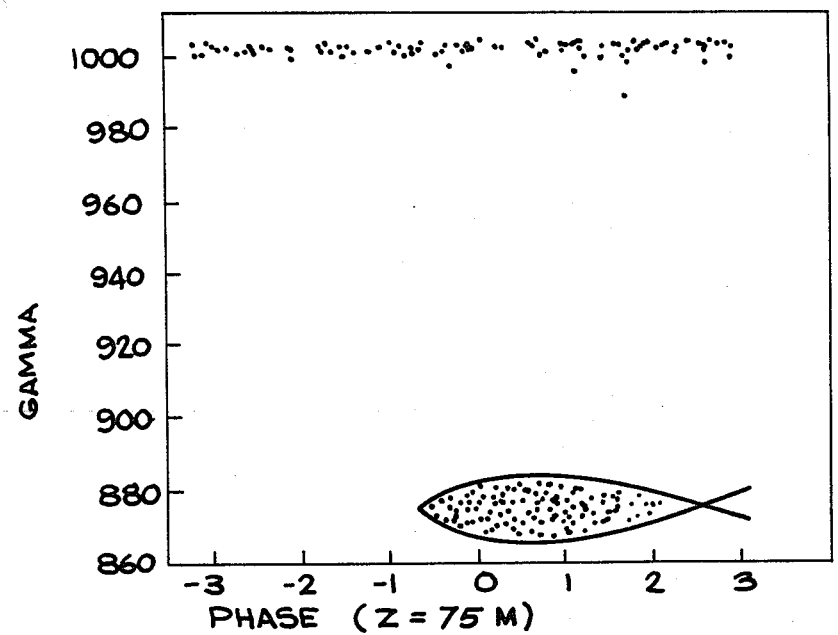
FIG. 7 is a schematic representation of distribution of the remaining electrodes in a "bucket" after the bucket has traveled Z=75 m.

As an example of the operation, assume one begins with an approximately uniform distribution of electons inside the particular phase space bucket of FIG. 4 (z=0), with initial "energies" $\gamma = \gamma_r = 940$ (E≈480 MeV). As the electrons propagate longitudinally and are decelerated according to Equation (2), a few of the electrons will escape from the bucket, as indicated by the presence of the dots (each dot representing an electron) both inside and outside the buckets in FIGS. 5, 6 and 7. Up to a certain length, the bucket tends to decrease in size and to contain most of the electrons initially present. However, beyond a certain point, the bucket stability appears to break down so that the FEL length must be limited, based upon present concepts.

Figure 8:
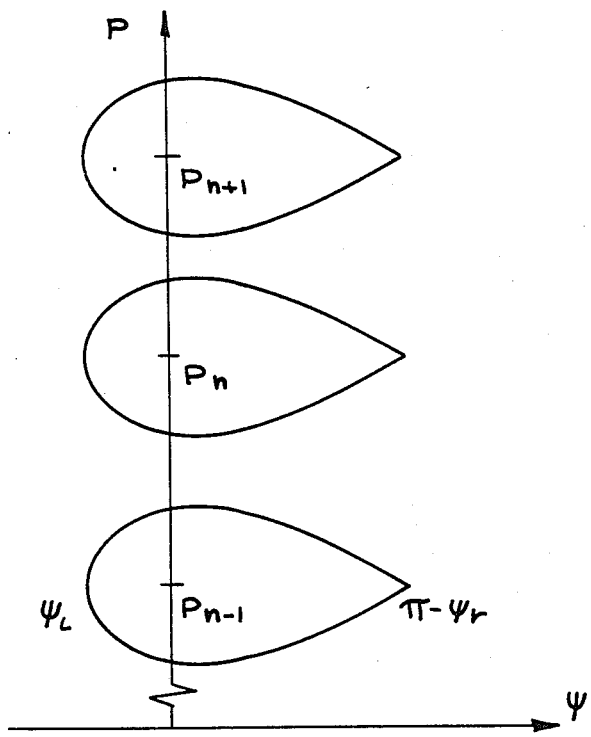
FIG. 8 is a schematic representation of three consecutive phase space "buckets" in the preferred embodiment of the invention.

With a sequence of buckets chosen as shown schematically in FIG. 8, the electrons need not be "bunched" so closely around the chosen resonant positions in phase space as the electrons will more or less naturally arrange themselves into buckets for simultaneous stable propagation. Equation (6) is used to partially determine local wiggler field strength $b_w(z)$ and wavelength $k_w(z)$.

The field of the $i^{th}$ bucket (i=1,2, ..., n) defines a stable region around the local resonant energy $\gamma_r^{(i)}$ and only converts the energy of electrons originally in that region. For $\epsilon/\Omega_{12}^2 << 1$ or, equivalently, $$\frac{4e_s^{(1 \text{ or } 2)} b_w \gamma_r^{(1)2}}{(k_s^{(2)} - k_s^{(1)})^2\left(1 + \frac{b_w}{2k_w^2}\right)^2} << 1 \quad (18)$$

the electrons on buckets No. 1 and 2 (or, more generally, nos. 1, 2, ... n) interact only minimally and can operate simultaneously and substantially independently. By an appropriate choice of incident light beam frequencies $\nu_1 < \nu_2 < \ldots < \nu_n$, several noninterfering buckets then operate simultaneously over the range of interest of electrons, thus increasing the efficiency of use of relativistic electrons and providing a multifrequency light beam amplifier. The various buckets appear to "track" one another properly during the deceleration process (as z or t increases) throughout the wiggler region. This allows one to use an accelerator with a higher electron energy spread (lower quality) or, equivalently, higher emittance, as most electrons will initially lie in one or another of the buckets.

From Eq. (6), the laser photon energy corresponding to a particular bucket (determined by $\gamma_r$) is $$H = h\nu_s = \frac{hck_s}{2\pi} = \frac{hck_w\gamma_r^2}{\pi\left(1 + \frac{b_w^2}{2k_w^2}\right)}.$$

Consider first the "standard operational mode" of the FEL, defined by the requirements $\psi_r \equiv 0$, $\dot{\psi}_r = 0$, (19)

$k_w = \frac{k_s}{2\gamma_r^2}\left(1 + \frac{b_w^2}{2k_w^2}\right)$, $\frac{d\psi_r}{dz} = 0$, $b_w$ = constant, $\lambda_w$ = constant, $H = \frac{A}{2}P^2 - C\cos\psi$.

Figure 9:
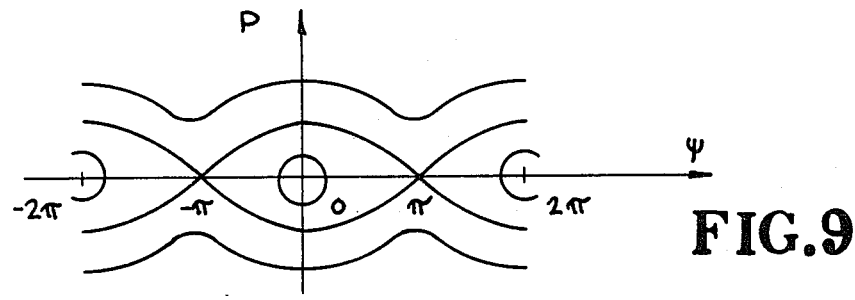
FIG. 9 is a graphic view of a sequence of stationary phase space "buckets" in a "standard operational mode" according to the preferred embodiment.
Figure 10:
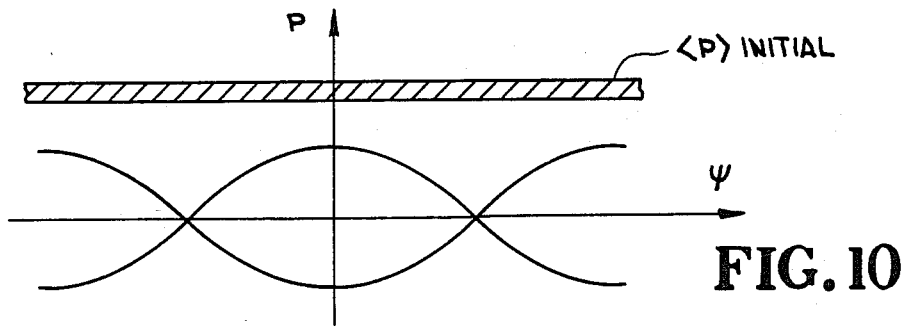
FIG. 10 is a graphic representation of initial electron phase space distribution according to the preferred embodiment.
Figure 11:
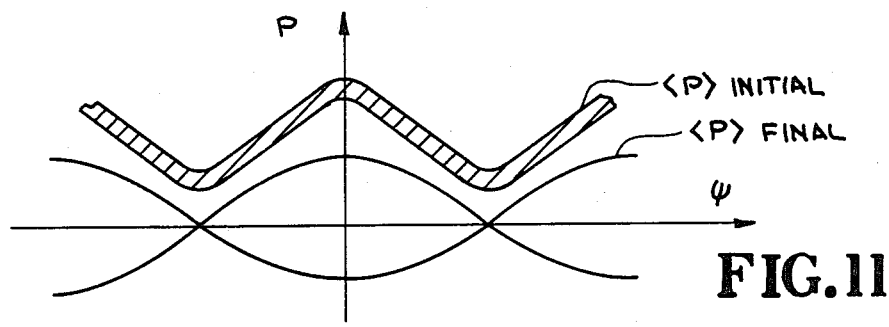
FIG. 11 is a graphic representation of electron phase space distribution at the end of phase 1 of the preferred embodiment.
Figure 12:
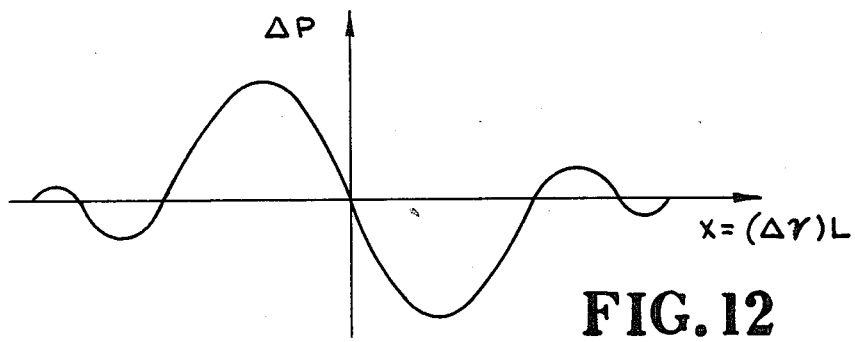
FIG. 12 is a representative graphic view of change in average electron energy $\Delta P$ as a function of the parameter $(\Delta \gamma)L$ (L=length of the FEL).

For this mode, the buckets are stationary (neither accelerating nor decelerating) and appear as the phase space curves (B) of FIG. 9. The energy of electrons injected energy will oscillate about the synchronous electron energy and will have the average energy of the synchronous electron. Thus, for successful FEL operation, one must avoid electron injection near the synchronous energy so that such electrons do not perform synchronous oscillations. One approach is to injet electrons having a small "momentum" spread ΔP as shown in FIG. 10 (input) and to withdraw electrons at appropriate positions when the electron phase space distribution has become modified as shown in FIG. 11. The change in average electron energy $\Delta\gamma = <P>_{final} - <P>_{initial}$ depends upon both initial electron energy and length L of the FEL. In particular, the change Δγ may be represented on a gain curve (FIG. 12) as a function of a single parameter $X = (\gamma_{initial} - \gamma_{final})L$ that combines the two above mentioned parameters.

A substantially monoenergetic electron beam that enters the wiggler region at an energy above the synchronous energy $\gamma_r$ will experience an increase in energy spread that is at least as large as the average electron energy loss, with the average electron energy decreasing toward $\gamma_r$. Accordingly, the average electron energy loss rate decreases and use of a FEL storage ring with repeated passes is not very attractive. The limit on rate at which energy can be extracted from the electron beam in a single pass FEL is inversely proportional to the wiggler length L so that a single pass system has low associated efficiency. Certain methods of operation may overcome this limitation.

A more attractive approach is adiabatic capture and deceleration, wherein the synchronous phase angle is changed after electron capture to provide a decelerating bucket. For a single pass device, one must insure that the phase area of the electrons does not exceed the area of the decelerating bucket so that the system efficiency is not degraded through "loss" of a large number of electrons. Of course, a portion of the electrons thus "lost" from one phase area may contribute positively to photon energy amplification in an adjacent phase area in the multifrequency FEL. In a multiple pass system, the electrons' phase area during any one pass should not increase during deceleration so that when the electrons are debunched at a lower energy the phase area is unchanged.

Figure 13A:
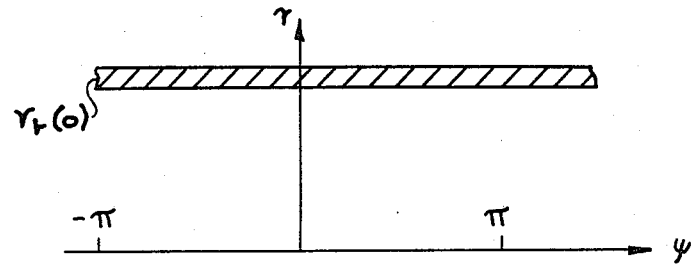
FIGS. 13(a-e) are idealized graphic representations of electron phase space distribution initially, after adiabatic capture, during deceleration, after complete deceleration and after decapture, respectively.
Figure 13B:
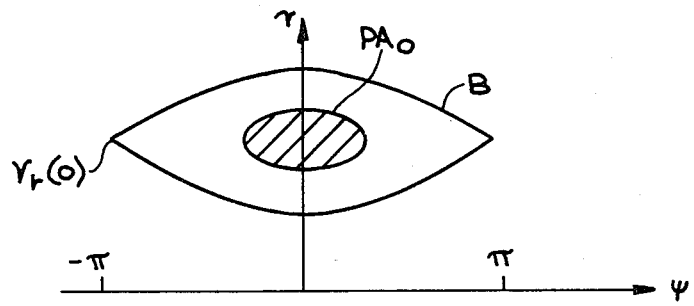
Figure 13C:
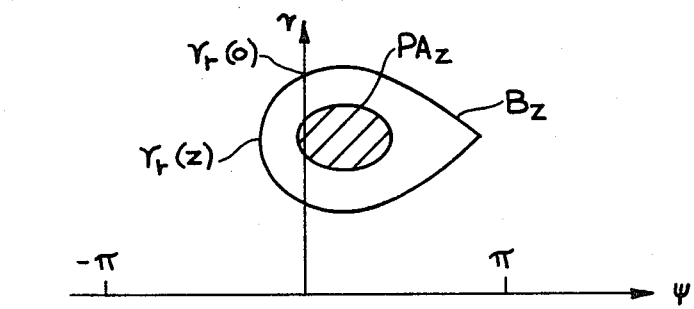
Figure 13D:
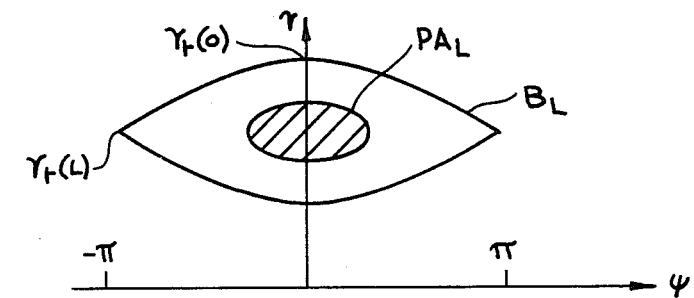
Figure 13E:
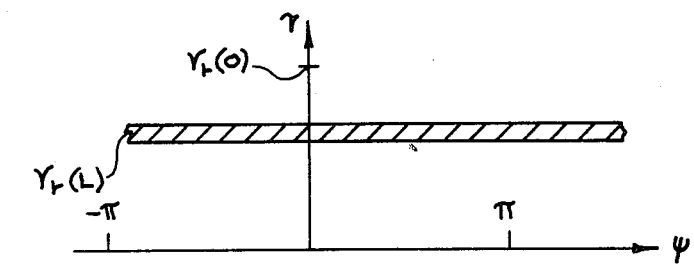

An idealized sequence is shown in FIGS. 13a–13c. In FIG. 13a, the electrons corresponding to a particular bucket, centered at $(P,\psi) \times (P_0,\psi)$, are initially provided in a substantially monoenergetic group with $P_0 = \gamma_r(o) - \gamma_r$ and $-\pi < \psi < \pi$. After adiabatic capture, the electrons occupy the phase area $PA_o$ in FIG. 13b inside the bucket $B_o$ defined, e.g., as in Eq. (16). During deceleration the resonant energy shifts downward from $P_o = \gamma_r(o) - \gamma_r$ to $P_z = \gamma_r(z) - \gamma_r$, and the phase area $PA_z$ and surrounding bucket $B_z$ also changes, as indicated in FIG. 13c. FIG. 13d shows the phase area $PA_L$ and surrounding bucket $B_L$ attained at Z=L after full electron deceleration; and FIG. 13e exhibits the phase area after decapture, with the momentum of the substantially monoenergetic electrons now centered at $P = \gamma_r(L) - \gamma_r$.

The wiggler region is divided into five regions: (1) $0 < z < Z_1$, where adiabatic capture occurs; (2) $Z_1 < Z < Z_2$, the transition region from stationary bucket to delecerating bucket; (3) $Z_2 < Z < Z_3$, the deceleration region; (4) $Z_3 < Z < Z_4$, the transition region from decelerating to stationary bucket; and (5) $Z_4 < Z < Z_5 = L$, the adiabatic decapture region.

The Adiabatic Capture Region. Region 1($0 < Z < Z_1$), uses a stationary bucket with $\psi_r = 0$ and a adiabatic increase in bucket height in order to avoid increasing the electrons' phase area. From Eq. (16), this requires a bucket height of $$P_m = \sqrt{\frac{b_w e_s}{k_s^2}} \qquad (20)$$

One begins with $P_m = 0$ at $Z = 0$ and allows $b_w$ to increase with z while maintaining the resonance condition $d\psi_r/dz = 0$ of Eq. (6) or $$b_w(z)^2 = 2k_w(z)^2\left(\frac{k_w(z)}{k_w(0)} - 1\right), \qquad (21)$$

$k_w(0) = \frac{k_s}{2\gamma_r^2}$, $\gamma_r = \gamma_r(0)$.

Combining Eqs. (20) and (21), one finds $$P_m^4 = \frac{2e_s^2}{k_w(O)^2} \cdot \frac{\frac{k_w(Z)}{k_w(O)} - 1}{\left(\frac{k_w(Z)}{k_w(O)}\right)^2}, \qquad (22)$$

and $P_m$ attains its maximum value at $k_w(Z_m) = 2k_w(O)$, (23)

-continued $$b_w(Z_m) = \sqrt{8}\, k_w(0).$$

With these latter choices as final values ($Z=Z_1=Z_m$) of the monotonically increasing parameters $k_w(Z)$ and $b_w(Z)$, respectively, the final bucket height in region 1 becomes $$P_m(Z_1) = \gamma_1 - \gamma_r = \sqrt[4]{\frac{e_s^2}{2k_w(0)^2}} = \sqrt[4]{\frac{2e_s^2}{k_s^2}}\, \gamma_r \quad (24)$$

The final capture bucket area $$A_1 = 4 \int_0^\pi P(\psi;\psi_r = 0)\, d\psi = 8\sqrt{\frac{A}{C}} = 16\sqrt{\frac{k_w(Z)^2}{b_w(Z)\, e_s}}$$

should be at least as large as, and preferably larger than, the initial bucket area.

The (monotonic) change from initial to final values of $k_w(Z)$ and $b_w(Z)$ within region 1 is somewhat arbitrary, consistent with the adiabatic requirement that these changes be "slow". One acceptable guideline is to allow at least one phase oscillation for the change from initial to final values of $k_w$ and $b_w$. Assuming small oscillations ($|\psi-\psi_r| << 1$), the Hamiltonian H in Eq. (14) can be linearized as $$H = \frac{A}{2} P^2 + \frac{C\cos\psi_r}{2}(\psi - \psi_r)^2 - C\sin\psi_r(\psi - \psi_r) -$$
$$C\{\cos\psi_r + \psi_r\sin\psi_r + O((\psi - \psi_r)^3)\};$$

and this modified Hamiltonian has an associated oscillation frequency $$\Omega^2 = \frac{C\cos\psi_r}{A} = \frac{b_w e_s}{4k_w^2}\cos\psi_r. \quad (25)$$

To allow for adiabatic change, then, the capture region should have a length $$Z_1 = \frac{2\pi}{\Omega} = \frac{4\pi\, k_w}{\sqrt{b_w e_s \cos\psi_r}}. \quad (26)$$

Thus, a high optical field, high wiggler field and small wiggler wavelength are consistent with a small electron adiabatic capture distance.

The constraints (23) and (24) are boundary value constraints, and one is free to choose relatively simple forms for $k_w(Z)$ and $b_w(Z)$ such as $$k_w(Z) = k_w(0)\, 1 + \left(\frac{Z}{Z_1}\right), \quad (27)$$

$$b_w(Z) = k_w(0)\sqrt{\frac{2Z}{Z_f}}\left(1 + \frac{Z}{Z_1}\right),$$

for the adiabatic capture region.

Figure 14:
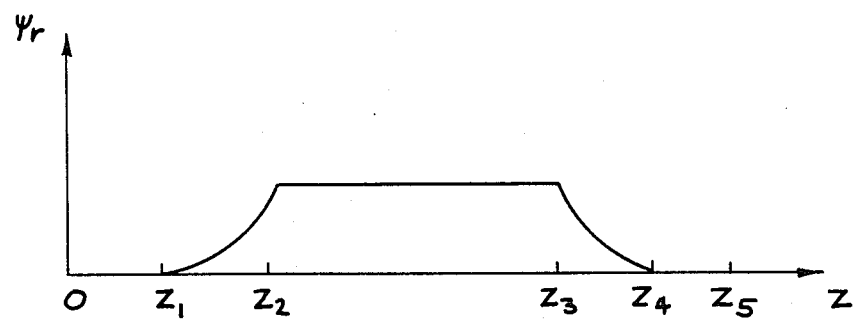
FIG. 14 is a graphic view of variation of phase space stability angle throughout consecutive longitudinal regions during electron beam deceleration by the wiggler magnetic field.

Transition Region. After adiabatic capture, the total deceleration process is implemented by change in the phase angle as follows:

region 2: $\psi_r(Z_1)=0 \rightarrow \psi_r(Z_2)=104\, _{rd}$;

region 3: $\psi_r(Z_2)=\psi_r(Z_3)=\psi_r(Z)=\psi_{rd}$ (constant), $\gamma_r$ changes;

region 4: $\psi_r(Z_3)=\psi_{rd} \rightarrow \psi_r(Z_4)=0$;

region 5: $\psi_r(Z)=0$;

This is illustrated in FIG. 14. One interesting approach here changes the magnetic field strength and the wiggler wavelength discontinuously at $Z=Z_1$ so that $$k_w(Z)=(1+f)k_{w1},\ (Z>Z_1)\ (f\ \text{constant}),$$
$$b_w(Z)=(1+f)b_{w1},$$
$$k_w(Z)/b_w(Z)=k_{w1}/b_{w1}.$$

The differential equations (2) and (7) for the synchronous coordinates may be linearized for small fractional changes in the synchronous energy $\gamma_r$ and become $$\frac{d\gamma_r}{dz} = -\frac{e_s}{\sqrt{2}\,\gamma_{r1}}\sin\psi_r. \quad (29)$$

$$\frac{d\psi_r}{dz} = \frac{2k_{w1}}{\gamma_{r1}}\left(\gamma_r - \gamma_{r1} + \frac{f}{2}\gamma_{r1}\right).$$

Figure 15A:
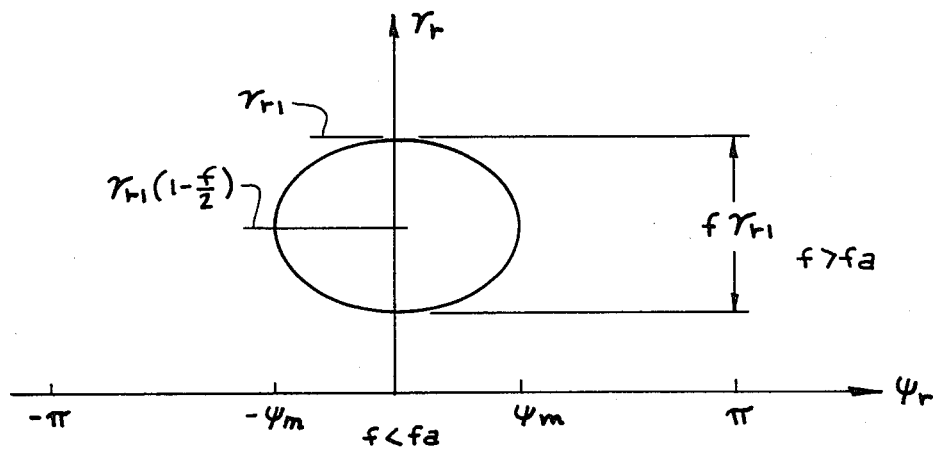
FIGS. 15(a,b) are graphical representations of the $(\gamma, \psi)$-space "buckets" for the transition or deceleration region according to the preferred embodiment.
Figure 15B:
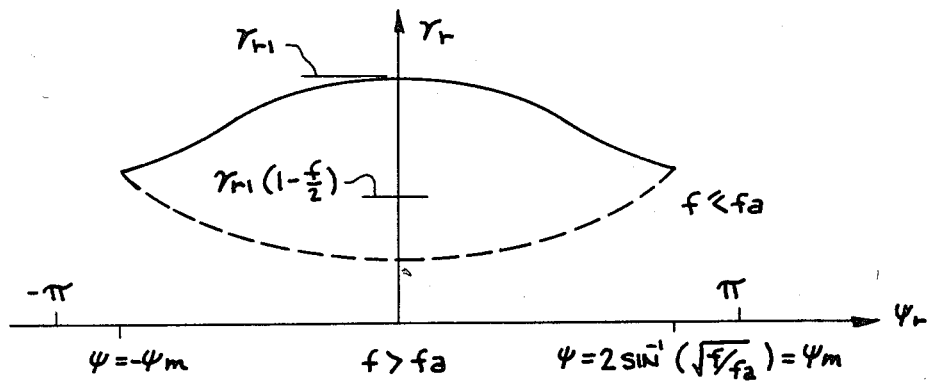

Using standard phase plane arguments and recalling that $\gamma_{r1}$, f, $k_{w1}$, and $e_s$ are constant here, one obtains the relationship $$\frac{4}{\gamma_{r1}^2}\left(\gamma_r - \gamma_{r1} + \frac{f}{2}\gamma_{r1}\right)^2 + \frac{1}{2}f_a^2(1 - \cos\psi) = f^2, \quad (30)$$

$$f_a^2 = \frac{4\sqrt{2}\, e_s}{k_{w1}\gamma_{r1}^2},$$

$$\psi_a = 2\sin^{-1}(\sqrt{f/f_a})\ (f\ f_a).$$

which is represented by the phase plane curves of FIG. 15a ($f \leq f_a$) and FIG. 15b ($f > f_a$).

Interest here focuses on the choice $f \leq f_a$. As the electrons move from $Z=Z_1$ to $Z=Z_2$, the phase angle increases from $\psi_r=0$ to $\psi_r=\psi_a$, and the electron synchronous energy $\gamma_r$ decreases by $\Delta\gamma=-f/2\gamma_{r1}$, as indicated in the upper curve in FIG. 15a. Omitting from consideration the middle region $Z_2 < Z < Z_3$ where $\psi_r = $ constant, the phase angle decreases from $\psi_r=\psi_a$ to $\psi_r=0$ as the electrons move from $Z=Z_3$ to $Z=Z_4$, and the electron synchronous energy again decreases by $\Delta\gamma=\frac{1}{2}f\gamma_{rinitial}$, as indicated by the lower curve in FIG. 15a. The total length $\Delta Z=Z_4-Z_1$, of regions 2, 3 and 4 is determined by integrating the equations (29) with the boundary conditions $\psi_r(Z_1)=0$, $(d\psi_r/dz)_{z1}=fk_{w1}$, $\gamma_r(Z_1)=\gamma_{r1}$, $\psi_r(Z_4)=0$, $\gamma_r(Z_4)=(1-f)\gamma_{r1}$. The total length of the transition region is approximately $$\Delta Z = Z_4 - Z_1 \simeq \frac{\pi \gamma_{r1}}{\sqrt{b_w e_s}}$$

if $\psi_a << \pi/2$. With the numerical choices $$\tfrac{1}{2} e_s^2 = 10^8 \text{ watts/cm}^2,$$

$$\gamma_{r1} = 200,$$

$$\lambda_s = 1 \text{ } \mu\text{m},$$

$$k_m = k_s/\gamma_{r1}^2 = 25 \text{ cm}^{-1},$$

this yields $\Delta Z = Z_4 - Z_1 = 6.8$ meters.

Adiabatic Decapture Region. At $Z = Z_4$, $d\psi_r/dz$ is discontinuously reduced to zero by a discontinuous change in the wiggler field strength and the wiggler wavelength $$\Delta b_w = f b_w,$$

$$\Delta k_w = f k_w,$$

after which the field strength $b_w$ decreases to zero as $Z \to Z_5$ so that the electrons are debunched. This process is the reverse of the process in the first region and is carried out adiabatically to conserve electron phase space density. Adiabatic decapture requires the same length as does adiabatic capture, which is $\Delta Z_{ac} \geq 13.6$ m for the numerical choice of system parameters above. One can choose forms for $k_w(Z)$ and $b_w(Z)$ ($Z_4 < Z < Z_5$) by analogy with Equations (27) for the decapture region, viz.

$$k_w(Z) = k_w(Z_5)\left(1 + \frac{Z_5 - Z}{Z_5 - Z_4}\right),$$

$$b_w(Z) = k_w(Z_5)\sqrt{2\left(1 - \frac{Z - Z_4}{Z_5 - Z_4}\right)\left(1 + \frac{Z_5 - Z}{Z_5 - Z_4}\right)}.$$

Adiabatic decapture length is the same as adiabatic capture length with the above choices of magnetic field parameters, which yields $$Z_{cap.} = Z_{decap.} > 13.6 \text{ m}.$$

For a single pass FEL, control of the bucket phase space area increase is not as critical as in a multipass FEL, as the electrons are discarded after the single pass. But fractional electron energy loss in a single pass FEL should be at least 10% for acceptable conversion efficiency. Two operational modes, low gain and high gain, are available for a single pass FEL. In the low gain mode, the optical field is recirculated; this requires only modest peak current density but will require an electron beam pulse rate of the order of $10^5$ per second. In the high gain mode, high current density is required, but the optical field need not be recirculated and the electron beam pulse repetition rates are reasonable.

Although the foregoing description of preferred embodiments is presented for purposes of illustration, it is not intended to limit the invention to the forms disclosed; and variation and modification may be made without departing from the scope of the invention.

We claim:

1. A method for increasing the efficiency of a free electron laser, the method comprising the steps of:
    providing a relativistic beam of electrons, each having electrical charge e, with a plurality of associated energies grouped around a sequence of energy values $E_i = mc^2 \gamma_r(i)$ ($i = 1, 2, \ldots, n$) where $mc^2$ is the rest mass of an electron and $1 < \gamma_r(1) < \gamma_r(2) \ldots \gamma_r(n)$;
    providing a transversely oriented wiggler magnetic field having an associated wiggler wavelength $\lambda_w = 2\pi/k_w$ and field strength $B_w = \sqrt{2} mc b_w/e$ through which the electron beam passes;
    providing a sequence of substantially monochromatic light beams with associated photon energies $$H_i = \frac{hc \, k_w (\gamma_r^{(i)})^2}{\pi \left(1 + \frac{b_w^2}{2k_w^2}\right)}$$

where $hc = 2 \times 10^{-16}$ erg-cm; and
    allowing each light beam to propagate parallel to and in timed relationship with the electron beam in the wiggler magnetic field region so that, as the electron beam decelerates in the magnetic field, the energy of the decelerated electrons is partially converted to and augments energy of one or more of the co-propagating light beams.

2. Apparatus for efficient amplification of light beam radiation, the apparatus comprising:
    magnetic field means for producing a transverse wiggler magnetic field of alternating polarity along a predetermined z-axis, the magnetic field having local field strength $B_w$, normalized magnetic field strength $b_w = eB_w/\sqrt{2}mc$ where e is the unit of electron charge, m is electron mass, $mc^2$ is electron rest energy, and local magnetic field period $\gamma_w = 2\pi/k_w$;
    electron beam means for providing a relativistic electron beam with a plurality of associated energies grouped around a sequence of energy values $E_i = mc^2 \gamma^{(i)}$ ($i = 1, 2, \ldots, n$) with $1 < \gamma^{(1)} < \gamma^{(2)} < \ldots < \gamma^{(n)}$ and for directing the electron beam along the predetermined z-axis of the wiggler magnetic field;
    light beam means for providing a sequence of substantially monochromatic light beams with associated photon energies $$H_i = \frac{hc \, k_w (\gamma^{(i)})^2}{\pi \left(1 + \frac{b_w^2}{k_w^2}\right)} \quad (i = 1, 2, \ldots, n)$$

where $hc = 2 \times 10^{-16}$ erg-cm, and for directing these light beams and the predetermined z-axis of the wiggler magnetic field in timed relationship with propagation of the electron beam therealong, whereby the sequence of light beams is amplified by interaction with the sequence of electron beams.

* * * * *